J. S. LEAKE.
FLEXIBLE PIPE JOINT.
APPLICATION FILED AUG. 1, 1913.
1,170,979.
Patented Feb. 8, 1916.
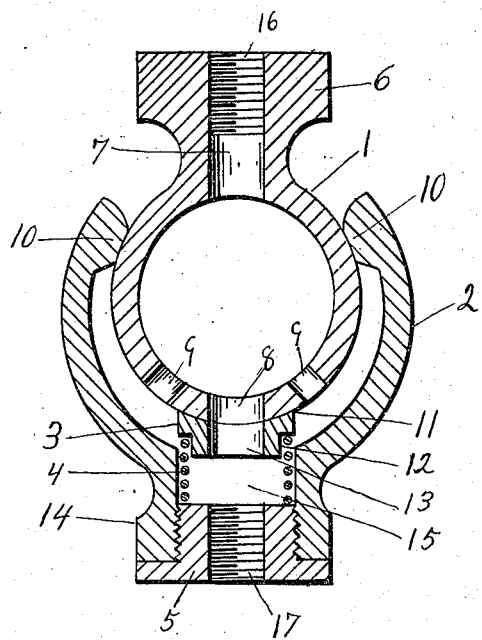
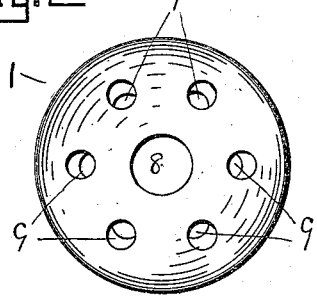
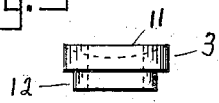
WITNESSES:
J. Henry Brady
F. H. Kappa
INVENTOR.
John S. Leake
W. B. Munnell
ATTORNEY.

UNITED STATES PATENT OFFICE.

JOHN S. LEAKE, OF LOUISVILLE, KENTUCKY.

FLEXIBLE PIPE-JOINT.

1,170,979.

Specification of Letters Patent.  Patented Feb. 8, 1916.

Application filed August 1, 1913.  Serial No. 782,477.

*To all whom it may concern:*

Be it known that I, JOHN S. LEAKE, a citizen of the United States, residing at Louisville, in the county of Jefferson and State of Kentucky, have invented a new and useful Improvement in Flexible Pipe-Joints, of which the following is a specification.

This invention relates to flexible pipe-joints, and an object is the provision of a strong and durable joint that will be particularly useful as a connection between the piping employed for transmitting air, steam and water on railway trains.

Another object is the provision of a flexible, or ball joint for metal pipes employed in the transmission of fluids under pressure, that shall be perfectly fluid tight and capable of being flexed at many angles.

A further object is the production of a joint having few parts, that shall be economical of construction and efficient in operation.

With these objects in view the invention consists of the novel construction set forth, and illustrated in the accompanying drawings which form a part of this specification, in which is set forth an embodiment of the invention, but it is to be understood that changes, variations and modifications may be resorted to that come within the scope of the claim appended hereunto.

In the drawings, in which like reference characters indicate like parts in the different views; Figure 1, is a central vertical section; Fig. 2, a bottom view of the male, or ball member; Fig. 3, an elevation of the block or shoe.

Referring to the drawings, the joint is seen to consist of a male member —1—, a female member —2—, a tension block —3—, a tension spring —4—, and a bushing —5—. The female member is a hollow sphere, and is provided with a stem —6—, through which a passage —7— leads to the interior of the sphere. The sphere, or ball 1 is provided with an orifice —8— diametrically opposite, and in alinement with the passage 7, and with a plurality of openings —9— arranged concentrically around the orifice 8, the combined area of said openings being at least equal to that of the orifice 8. The female, or bell member 2, envelops the major portion of the male member, and its inner end is provided with a ring —10— that is in sliding contact therewith at a point beyond the center thereof in view of which endwise separation of the two members is impossible. The metal to metal contact at this point dispenses with the need of a stuffing box, packing or other device usually employed to secure a tight joint. The block or shoe 3 is provided with a concave face —11—, shown in Fig. 1 and indicated by dotted lines in Fig. 3, that is adapted to bear on the perimeter of the male member; it is further provided with a depending stem —12—, and with a passage —13— that normally registers with the orifice 8, in the male member. The female member has a stem —14— provided with a bore —15—, opening into the interior thereof, that is threaded for a portion of its length, adapting it for the reception of the bushing 5, the remaining portion being smooth and adapted for the reception of the spring 4. The spring 4 is adapted to encircle the stem 12, of block 3, and is held in position by the bushing 5. The office of the spring and block is to hold the male member in constant contact with the bearing ring 10, of the female member; without the spring the ball would be held against the ring only by the pressure of the flowing fluid, and when the pressure fell off, or ceased, the ball would be apt to fall away and permit a leak to occur. When joints of this character are used for conducting steam great difficulty is experienced at times by small particles of scale, carried by the steam, working between the bearing faces of the joint. Such joints in railway train service, usually used for conveying air or steam, depend beneath the cars and are almost constantly surrounded by a driving, swirling cloud of dust and grit that finds a lodgment on every portion of the joint and inevitably works between the bearing faces of the joint. Forcing the ball member inward against the pressure of the spring 4 will separate the bearing faces of the two members and allow the fluid to escape therebetween, the force of which will blow out any extraneous matter that may have worked between said faces.

The passage 7, and bushing 5 are each provided with threaded portions, —16— and —17— respectively to permit connection with pipes. In the straight away position, illustrated, fluid entering through the passage 7 will escape through the orifice 8, passage 13, in the block 3, and bore 15; when the male member is flexed the block 3 will partly close the orifice 8, the fluid will then find its way through the openings 9 and between the convolutions of the spring 4 into the bore 15 and out through the connected pipe. The male member is first cast, and finished up complete, it is then arranged to serve as a core, placed in a mold and the female member cast integrally around it. The bearing ring 10 being cast against the metal, of part 1, chills forming a hard, durable bearing face. After removal from the mold the bore 15 is tapped out, the block introduced, through the bore, the spring 4 placed in position and secured in place by means of the bushing 5. The joint is then ready for service.

From the foregoing it will be seen that I have produced a flexible joint that will be economical in construction and durable and efficient in service.

Having thus described my invention so that any one skilled in the art pertaining thereto may make and use the same, I claim:—

A flexible pipe-joint, comprising a hollow spherical male member having an inlet and an outlet, a female member formed integrally around a major portion of the male member, with a bearing ring in contact therewith beyond the center thereof, a stem on the female member having a bore which opens into the interior thereof, a shoe adapted to be introduced through said bore and bearing on the male member, a stem on the shoe, said shoe and stem provided with a perforation extending therethrough, said stem depending within said bore, a bushing within said bore and a spring interposed between said bushing and the shoe.

JOHN S. LEAKE.

Witnesses:
W. B. MUNNELL,
F. H. KAPPA.

Copies of this patent may be obtained for five cents each, by addressing the "Commissioner of Patents. Washington, D. C."